(12) United States Patent
Janakiraman et al.

(10) Patent No.: US 10,543,442 B2
(45) Date of Patent: Jan. 28, 2020

(54) MULTIPLE STAGE ROTATING COALESCER DEVICES

(71) Applicant: Cummins Filtration IP, Inc., Columbus, IN (US)

(72) Inventors: Arun P. Janakiraman, Stoughton, WI (US); Scott Heckel; Brian W. Schwandt, Fort Atkinson, WI (US); Jerald J. Moy, Oregon, WI (US); Himani Deshpande, Fitchburg, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 83 days.

(21) Appl. No.: 15/561,170

(22) PCT Filed: Mar. 30, 2015

(86) PCT No.: PCT/US2015/023290
§ 371 (c)(1),
(2) Date: Sep. 25, 2017

(87) PCT Pub. No.: WO2016/159951
PCT Pub. Date: Oct. 6, 2016

(65) Prior Publication Data
US 2018/0117512 A1 May 3, 2018

(51) Int. Cl.
*B01D 46/18* (2006.01)
*B01D 46/00* (2006.01)
(Continued)

(52) U.S. Cl.
CPC .......... *B01D 46/003* (2013.01); *B01D 45/14* (2013.01); *B01D 46/0056* (2013.01);
(Continued)

(58) Field of Classification Search
CPC .. B01D 46/003; B01D 45/14; B01D 46/0056; B01D 2279/30; F01M 13/04; F01M 2013/0422; F01M 2013/0438; C08L 67/04
See application file for complete search history.

(56) References Cited

U.S. PATENT DOCUMENTS 3,362,155 A * 1/1968 Driscoll .................... F02C 7/05
415/121.2
3,531,897 A    10/1970 Weimar
(Continued)

FOREIGN PATENT DOCUMENTS

CN      101491793 A      7/2009
CN      104334284 A      2/2015
(Continued)

OTHER PUBLICATIONS

International Search Report and Written Opinion issued for PCT/US2015/023290, dated Jun. 29, 2015, 10 pages.
(Continued)

*Primary Examiner* — Dung H Bui
(74) *Attorney, Agent, or Firm* — Foley & Lardner LLP (57) ABSTRACT

Disclosed are multiple stage rotating coalescer devices comprising a first stage and a second stage. The first stage may include a rotating coalescing element comprising coalescing media. The second stage is positioned either upstream or downstream or the first stage. The second stage may include one of: (i) a rotating cone stack separator, or (ii) a separate rotating coalescing element comprising coalescing media.

15 Claims, 9 Drawing Sheets

(51) Int. Cl.
*B01D 45/14* (2006.01)
*F01M 13/04* (2006.01)
*C08L 67/04* (2006.01)

(52) U.S. Cl.
CPC ......... *F01M 13/04* (2013.01); *B01D 2279/30* (2013.01); *C08L 67/04* (2013.01); *F01M 2013/0422* (2013.01); *F01M 2013/0438* (2013.01)

(56) References Cited

U.S. PATENT DOCUMENTS

| | | | |
|---|---|---|---|
| 4,189,310 A | 2/1980 | Hotta | |
| 4,482,365 A | 11/1984 | Roach | |
| 4,487,618 A | 12/1984 | Mann | |
| 4,514,193 A | 4/1985 | Booth | |
| 4,516,994 A | 5/1985 | Kocher | |
| 4,981,502 A | 1/1991 | Gottschalk | |
| 5,056,935 A | 10/1991 | Singh | |
| 5,466,385 A | 11/1995 | Rogers et al. | |
| 5,716,423 A | 2/1998 | Krul et al. | |
| 5,863,317 A | 1/1999 | Smith et al. | |
| 6,033,450 A * | 3/2000 | Krul | B01D 45/14 55/345 |
| 6,123,061 A | 9/2000 | Baker et al. | |
| 6,139,595 A | 10/2000 | Herman et al. | |
| 6,183,407 B1 * | 2/2001 | Hallgren | B04B 1/04 494/49 |
| 6,499,285 B1 * | 12/2002 | Snyder | B64D 33/02 244/53 B |
| 6,517,612 B1 | 2/2003 | Crouch et al. | |
| 6,640,792 B2 | 11/2003 | Harvey et al. | |
| 6,652,439 B2 * | 11/2003 | Herman | B04B 1/04 184/6.24 |
| 6,709,477 B1 | 3/2004 | Haakansson et al. | |
| 7,235,177 B2 | 6/2007 | Herman et al. | |
| 7,811,347 B2 | 10/2010 | Carlsson et al. | |
| 7,824,458 B2 | 11/2010 | Borgstrom et al. | |
| 7,824,459 B2 | 11/2010 | Borgstrom et al. | |
| 8,172,917 B2 | 5/2012 | Kup et al. | |
| 8,268,033 B2 | 9/2012 | Rogers et al. | |
| 8,794,222 B2 | 8/2014 | Schwandt et al. | |
| 8,974,567 B2 | 3/2015 | Verdegan et al. | |
| 2004/0214710 A1 * | 10/2004 | Herman | B04B 5/005 494/36 |
| 2006/0096263 A1 | 5/2006 | Kahlbaugh et al. | |
| 2007/0039300 A1 | 2/2007 | Kahlbaugh et al. | |
| 2007/0175191 A1 * | 8/2007 | Ziebold | B01D 46/0031 55/482 |
| 2007/0249479 A1 | 10/2007 | Eliasson et al. | |
| 2007/0271884 A1 | 11/2007 | Pearson et al. | |
| 2009/0000258 A1 * | 1/2009 | Carlsson | B01D 45/14 55/400 |
| 2009/0044702 A1 | 2/2009 | Adamek et al. | |
| 2009/0056292 A1 | 3/2009 | Fornof et al. | |
| 2009/0067986 A1 * | 3/2009 | Mignano | F01D 5/081 415/115 |
| 2009/0101013 A1 * | 4/2009 | Moredock | B01D 45/16 95/269 |
| 2009/0263238 A1 * | 10/2009 | Jarrah | F04D 29/544 415/199.5 |
| 2010/0126145 A1 | 5/2010 | He et al. | |
| 2010/0180854 A1 | 7/2010 | Baumann et al. | |
| 2010/0229511 A1 * | 9/2010 | Steins | B01D 46/0046 55/337 |
| 2011/0180051 A1 * | 7/2011 | Schwandt | F01M 13/04 123/573 |
| 2011/0198280 A1 | 8/2011 | Jones et al. | |
| 2011/0247309 A1 * | 10/2011 | Smith | F01M 13/04 55/447 |
| 2011/0252974 A1 | 10/2011 | Verdegan et al. | |
| 2012/0034083 A1 * | 2/2012 | Shoji | F04D 25/0613 416/189 |
| 2012/0315225 A1 | 12/2012 | Porbeni et al. | |
| 2013/0037481 A1 | 2/2013 | Lalouch et al. | |
| 2013/0167816 A1 | 7/2013 | Dawar et al. | |
| 2014/0069432 A1 * | 3/2014 | Mebasser | A61M 16/0066 128/205.25 |
| 2014/0096683 A1 * | 4/2014 | Azwell | B01D 46/2403 95/268 |
| 2014/0326661 A1 | 11/2014 | Madsen et al. | |
| 2015/0047582 A1 | 2/2015 | Dawar et al. | |
| 2015/0075377 A1 * | 3/2015 | Gorbach | B04B 5/12 95/270 |
| 2015/0173577 A1 * | 6/2015 | Kim | A47L 9/22 15/412 |
| 2016/0030875 A1 | 2/2016 | Parikh et al. | |
| 2016/0245157 A1 * | 8/2016 | Wilkins | F02B 37/183 |
| 2018/0030868 A1 | 2/2018 | Elsaesser et al. | |
| 2018/0117512 A1 | 5/2018 | Janakiraman et al. | |

FOREIGN PATENT DOCUMENTS

| | | |
|---|---|---|
| DE | 100 44 615 | 4/2002 |
| DE | 203 02 824 U1 | 8/2004 |
| DE | 10 2006 024 816 | 12/2007 |
| EP | 1 532 352 A1 | 5/2005 |
| EP | 1 645 320 A1 | 4/2006 |
| FR | 2933626 A1 | 1/2010 |
| JP | H11-141325 | 5/1999 |
| WO | WO 2011/100712 | 8/2011 |
| WO | WO 2012/106659 | 8/2012 |
| WO | WO 2013/025445 | 2/2013 |
| WO | WO-2016/046944 A1 | 3/2016 |
| WO | WO 2016/159951 | 10/2016 |
| WO | WO-2016/159951 A1 | 10/2016 |
| WO | WO 2017/189516 | 11/2017 |
| WO | WO-2018/002244 A1 | 1/2018 |

OTHER PUBLICATIONS

Holdich, R.G., "Fundamentals of Particle Technology," show Chapter 8, Midland Information Technology and Publishing, Jan. 1, 2002, 15 pages.

International Search Report and Written Opinion Issued for PCT Application No. PCT/US2016/047755, dated Nov. 4, 2016, 10 pages.

International Search Report and Written Opinion issued for PCT/U2017/029315, dated Aug. 1, 2017, 14 pages.

International Search Report and Written Opinion issued for PCT/US2016/036384, dated Aug. 25, 2016, 9 pages.

International Search Report and Written Opinion issued for PCT/US2016/036432, dated Aug. 31, 2016, 24 pages.

International Search Report and Written Opinion issued for PCT/US2016/048912, dated Nov. 10, 2016, 12 pages.

Chinese Office Action from corresponding CN Application No. 2016800326319, dated Mar. 18, 2019, pp. 1-6.

First Office Action for Chinese Patent App. No. 2015800784030 dated Mar. 1, 2019, 19 pages (with translation).

International Search Report and Written Opinion for PCT/US2016/047755, dated Nov. 4, 2016, 10 pages.

Extended European Search Report for European Patent App. No. 17790235.0 dated Oct. 25, 2019, 9 pages.

Office Action issued for U.S. Appl. No. 16/096,585, dated Oct. 16, 2019, 10 pages.

* cited by examiner

MULTIPLE STAGE ROTATING COALESCER DEVICES

CROSS-REFERENCE TO RELATED APPLICATIONS

The present application is a National Stage of PCT Application No. PCT/US2015/023290, filed Mar. 30, 2015, the contents of which is hereby incorporated by reference in its entirety.

TECHNICAL FIELD

The field of the invention relates to coalescing devices. In particular, the field of the invention relates to coalescing devices comprising multiple rotating separation elements.

BACKGROUND

Rotating coalescers are utilized in crankcase ventilation (CV) systems for removing oil from crankcase blow-by gases. Typically, the blow-by gases enter the rotating coalescer device axially at the center of the device. The gases are turned 90 degrees, pass through a rotating coalescer section, and exit radially from the outer face of the rotating coalescer device. The rotating coalescer device itself is in the form of a ring and the space in the middle of the ring is either left open or optionally includes radial vanes which facilitate flow through the device.

Rotating coalescers may include fibrous filters as well as centrifugal separation devices. Performance attributes of rotating coalescer devices may be measured in terms of pressure drop (or rise) through the device and efficiency of oil removal. In rotating coalescers, the oil droplets (e.g., aerosol) suspended and transported by the blow-by gas are separated inside the coalescer media through the particle capture mechanisms of inertial impaction, interception, and diffusion. By rotating the media, inertial impaction is enhanced by the additional centrifugal force. In addition to this aspect, after the oil droplets coalesce to form larger drops, the centrifugal force removes the larger drops by overcoming the surface drag force of the media fibers. This aspect increases the coalescence of the oil from the coalescer by providing improved drainage compared to a stationary coalescer. In turn, the improved drainage from the rotating coalescing filter aids in improving the filtration efficiency as well as greatly reducing the pressure drop across the filter.

SUMMARY

Various embodiments relate to multiple stage rotating coalescer devices that exhibit increased efficiency and reduced pressure drop are described. One stage of the device is a rotating coalescer element. The devices may include an additional separation element, either upstream or downstream of the rotating coalescer element, which may include a cone stack separator or an additional rotating coalescer element.

One exemplary embodiment relates to a multiple stage rotating coalescer device. The multiple stage rotating coalescer device includes a first stage including a rotating coalescing element. The rotating coalescing element includes coalescing media. The device includes a second stage. The second stage is either upstream or downstream of the first stage. The second stage includes one of a rotating cone stack separator or a separate rotating coalescing element having coalescing media.

Another exemplary embodiment relates to a rotating coalescer system. The system includes a housing having an inlet and an outlet. The inlet is configured to receive blow-by gas from a crankcase of an internal combustion engine. The outlet is configured to output filtered air. The system further includes a rotating coalescer positioned within the housing. The rotating coalescer includes a first endplate and a second endplate. A spiral vane preseparator is positioned between the first endplate and the second endplate. The spiral vane preseparator includes a plurality of curved vanes that cause separation of an oil from the blow-by gas and pumping of the blow-by gas when the spiral vane preseparator is rotating. The rotating coalescer further includes a coalescer element circumferentially surrounding the spiral vane preseparator and positioned between the first endplate and the second endplate. The coalescer element is comprised of coalescer media. The rotating coalescer includes a de-swirler coupled to the first endplate opposite the spiral vane preseparator and the coalescer element.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, multiple stage rotating coalescer devices are described. The multiple stage rotating coalescing devices exhibit advantages over rotating coalescing devices of the prior art. In some embodiments, the presently disclosed devices may include an integrated coalescing element upstream or downstream of a cone stack centrifugal separator in order to improve efficiency and pumping power of the devices. The devices may include two stages of aerosol separation (e.g., for rotating-type separators). In further embodiments, the presently disclosed devices also may include a shroud that collects and drains collected oil from the interstitial space between the cone stack separator and the coalescing element. In even further embodiments, the devices may integrate a cone stack separator downstream of a coalescing element in an outside-in configuration in order to improve overall performance and better accommodate the air/oil flow through the device.

In some embodiments, the disclosed devices may include a secondary rotating coalescer element downstream of a primary rotating coalescer element, where flow through the primary rotating element is inside-out and flow through the secondary rotating element is outside-in. The two rotating elements may share the same base plate. The primary and secondary elements rotate on single-drive or multiple-drive mechanisms that utilize single or multiple shafts and have multiple seals. The rotation of the primary and secondary element in the presently disclosed devices may provide continuous self-cleaning of the media of the elements and enhanced droplet coalescing. The fiber architecture of the media of the primary and secondary elements may be the same or different and optionally may include oleophobic treatment. For example, the media of the secondary element may be an oleophobic screen that prevents oil carryover and increases the pumping effect of the device.

Figure 1:
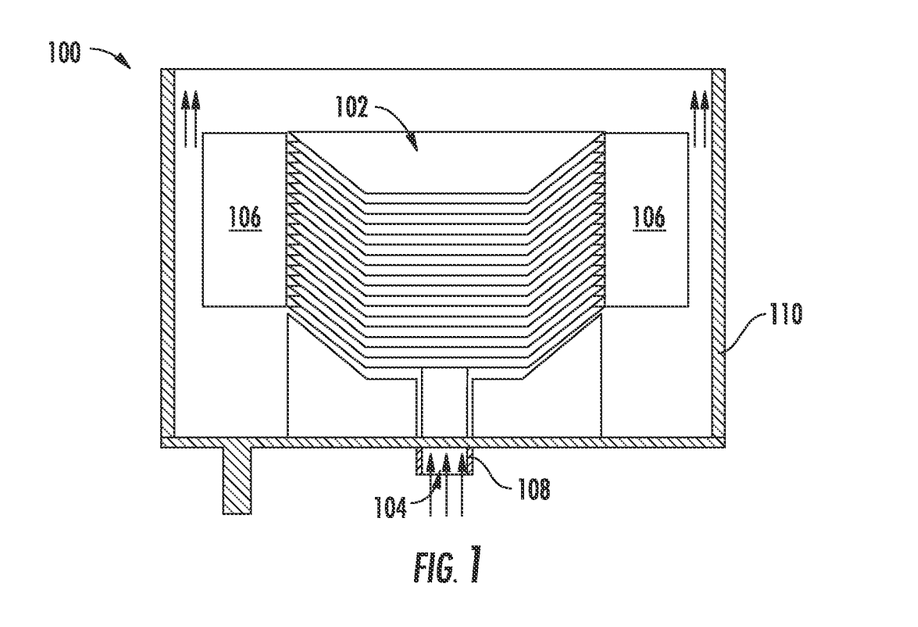
FIG. 1 is a cross-sectional view of a rotating coalescer device according to an exemplary embodiment.

Referring to FIG. 1, a cross-sectional view of a rotating coalescer device 100 is shown according to an exemplary embodiment. The coalescer device 100 includes a centrifugal cone stack separator 102 positioned in the center of the coalescer device 100. The cone stack separator 102 acts as a pre-cleaner, providing an initial stage of inertial separation of aerosol (e.g., oil) from blow-by gases entering the inlet 104 prior to the blow-by gases passing through the coalescing element 106. The coalescing element 106 is comprised of a coalescing media. The coalescing element 106 is a second stage of separation of aerosol from the blow-by gases. The pre-cleaning reduces the total amount of oil that the coalescing element 106 needs to separate by pre-capturing some fraction of the overall oil aerosol contained in the crankcase blow-by gases. The cone stack separator 102 also increases the amount of pumping of the blow-by gas flow in the coalescer device 100. In addition, the cone stack separator 102 also helps to distribute the flow evenly across the inlet face of the coalescing element 106 thereby increasing the performance of the coalescing element 106.

During operation of the coalescer device 100, both the cone stack separator 102 and the coalescing element 106 are coupled to and rotated by a shaft 108 passing through the center of the coalescer device 100. In some arrangements, the shaft 108 is hollow and provides the inlet into the coalescer device 100. The blow-by gas flow enters the center of a housing 110 of the device 100, into the inside of the cone stack separator 102 via the inlet 104. Within the cone stack separator 102, blow-by gas flows radially outward where at least some of the aerosol in the blow-by gas is removed due to centrifugal impaction of the aerosol on the surfaces of the cone stack separator 102. The cone stack separator 102 further adds mechanical energy to the blow-by gas flow by accelerating the flow of the blow-by gas in a tangential direction with respect to the center axis of the coalescer device 100. The added mechanical energy to the blow-by gas by the cone stack separator 102 creates a pumping effect similar to the action of a pump, which reduces the pressure drop caused by the coalescer device 100. After exiting from the cone stack separator 102, the blow-by gas flow enters the coalescing element 106 where additional filtration (e.g., coalescing of the aerosol in the blow-by gas) and pumping takes place. Upon leaving the coalescer device 100, the blow-by flow is vented either to the atmosphere (e.g., as done in an open CV system) or back to an intake stream (e.g., to the turbocharger inlet) of the internal combustion engine for combustion (e.g., as done in a closed CV system).

Figure 2:
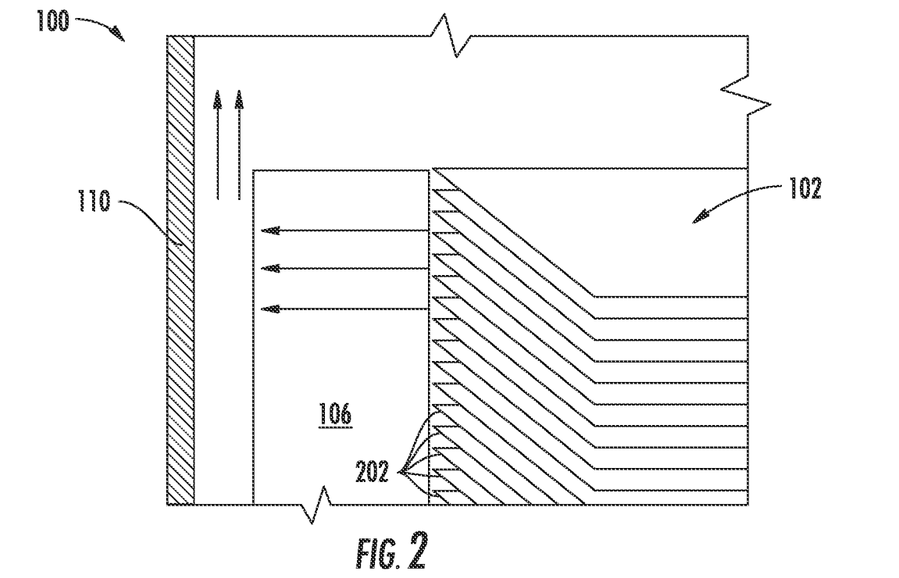
FIG. 2 is a close-up cross-sectional view of the coalescer device of FIG. 1.

Referring to FIG. 2, a close-up cross-sectional view of the coalescer device 100 is shown. FIG. 2 shows the flow of the blow-by gas passing through the cone stack separator 102 and through the coalescing element 106. As shown in FIG. 2, the cone stack separator 102 is comprised of a plurality of cones 202. The cones 202 are spaced out to provide a plurality of flow paths in between pairs of adjacent cones 202. Each of the cones 202 includes a bend that causes the centrifugal impaction of the aerosol on the surfaces of the cone stack separator 102 as discussed above.

Figure 3:
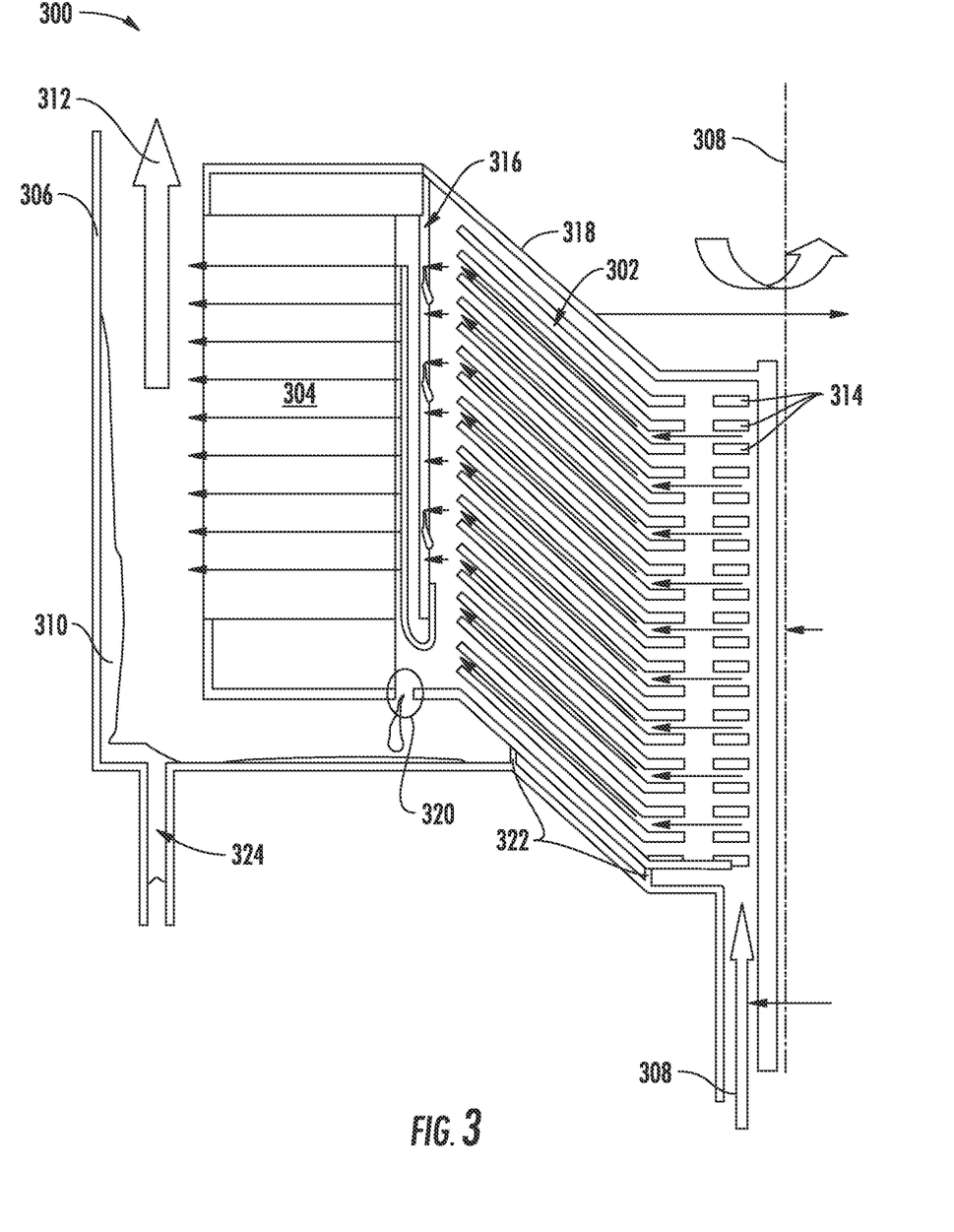
FIG. 3 is a cross-sectional view of a rotating coalescing device according to another exemplary embodiment.

FIG. 3 shows a cross-sectional view of a coalescer device 300 is shown according to an exemplary embodiment. The coalescer device 300 is a rotating coalescer device. Similar to the coalescer device 100, the coalescer device 300 includes a cone stack separator 302 and a coalescing element 304 comprised of coalescing media. The cone stack separator 302 and the coalescing media are housed within a housing 306. During operation, the cone stack separator 302 and the coalescing element 304 are rotated about a central axis 308 in a similar manner as described above with respect to the coalescer device 100. The coalescer device 300 separates oil 310 from a flow 312 of blow-by gases containing aerosol. In some arrangements, the cones 314 of the cone stack separator include spacers (e.g., raised ridges, ribs, dots, etc.) that radiate out in a straight line or a curve. These spacers provide separation between the cones 314. The coalescer device 300 includes a shroud 316 that collects oil 310 exiting from the cone stack separator 302. The collected oil 310 falls down the face of the shroud to the bottom of the rotating module 318 due to gravity. The rotating module 318 houses cone stack separator 302 and the coalescing element 304 for rotation within the housing 306. The open area below the shroud 316 leading to the coalescer element 304 is arranged such that the collected oil 310 is not carried over to the coalescer element 304 and instead collects at the bottom of the rotating module 318 where it drains through a preseparator drain 320. The preseparator drain 320 rotates with the rotating module 318. The preseparator drain 320 is sized and positioned based on the pressure difference on either side of the rotating module 318 to allow for draining of the separated oil 310 via gravity. The dimensions of the preseparator drain 320 are selected in order to minimize the potential for blow-by gas flow from the cone stack separator 302 to bypass the coalescer element 304 by flowing out of the preseparator drain 320. The size of the preseparator drain 320 is also sized based at least in part on the pumping force generated by the cone stack separator 302. Separated oil 310 does not flow back through the inlet because the rotating module 318 is sealed against the housing 310 through at least one seal 322 (shown as two seals). Oil 310 separated via the cone stack separator 302 and the coalescer element 304 is drained from the housing via a housing drain 324.

Figure 4:
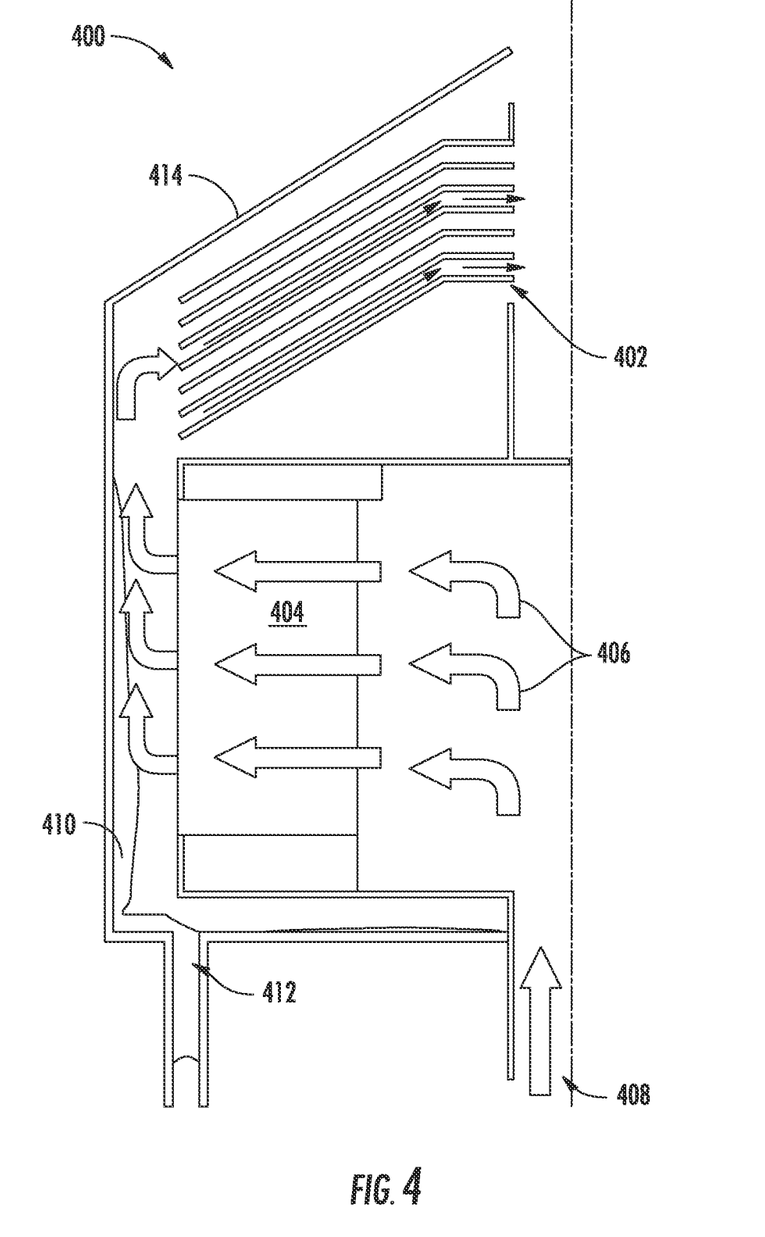
FIG. 4 is a cross-sectional view of a rotating coalescer device according to still another exemplary embodiment.

FIG. 4 shows a cross-sectional view of a coalescing device 400 according to an exemplary embodiment. The coalescing device 400 includes a cone stack separator 402, which functions as an inertial post-separator, and a rotating coalescer element 404 comprised of coalescing media. The cone stack separator 402 functions as an inertial post-separator because the cone stack separator 402 is positioned downstream of the rotating coalescer element 404 with respect to the by-pass gas flow 406. The cone stack separator 402 and the coalescing element 404 are rotated in a similar manner as described above with respect to devices 100 and 300 to effect pumping and separation of oil from the by-pass gas flow 406. In the coalescing device 400, a top portion of the coalescing element opposite the inlet 408 is received in a bottom portion of the cone stack separator 402, which is utilized for guiding oil 410 to the drain 412 of the housing 414. In the coalescing device 400, slots or holes may be provided to improve drainage and prevent oil carryover.

Figure 5:
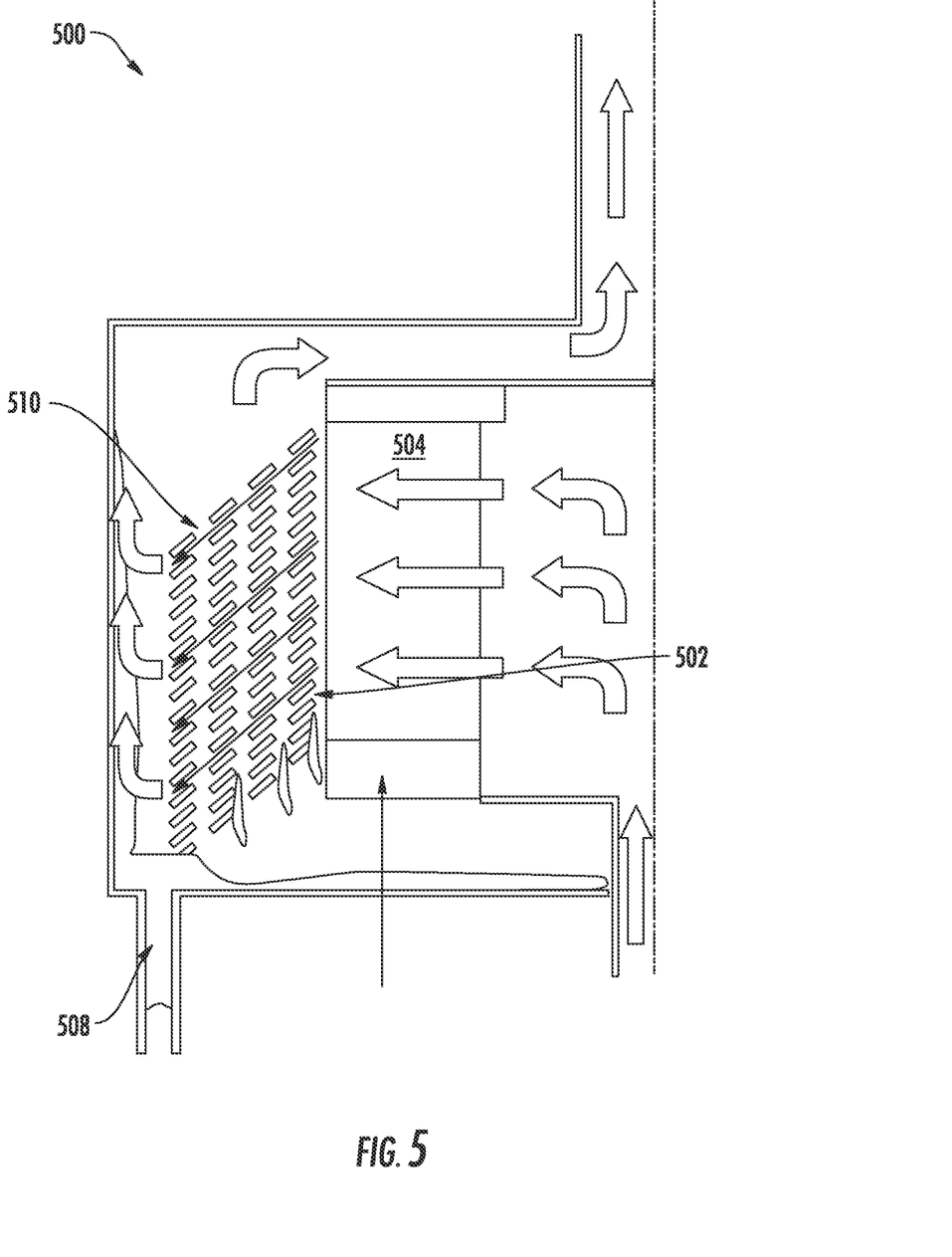
FIG. 5 is a cross-sectional view of a rotating coalescer device according to a further exemplary embodiment.

FIG. 5 shows a cross-sectional view of a rotating coalescer device 500 according to another exemplary embodiment. The rotating coalescer device 500 includes a cone stack separator 502 placed downstream of a coalescer element 504 in an inside-out flow configuration. The coalescer device 500 of FIG. 5 is designed to reduce oil carryover and to separate out re-entrained droplets. The coalescer device 500 may be particularly desirable for coalescers having a housing that is diametrically constrained (e.g., due to limited space on an engine-mounted device), where oil carryover is particularly an issue. In the rotating coalescer device 500, the post-separator cone stack separator 502 has inside-out flow and the re-entrained oil is flung from the device due to centrifugal force. Separated oil drains from the housing 506 through a drain 508. The cone stack separator 502 is shaped to direct the flow of blow-by gas towards the drain 508. The cone stack separator 502 includes slots or holes 510 to drain the coalesced droplets by gravitational force and by positive pumping pressure created through the rotation of the coalescer element 504 and the cone stack separator 502. The media of the coalescer element 504 may be embedded or coupled to the cone stack separator 502.

Figure 6:
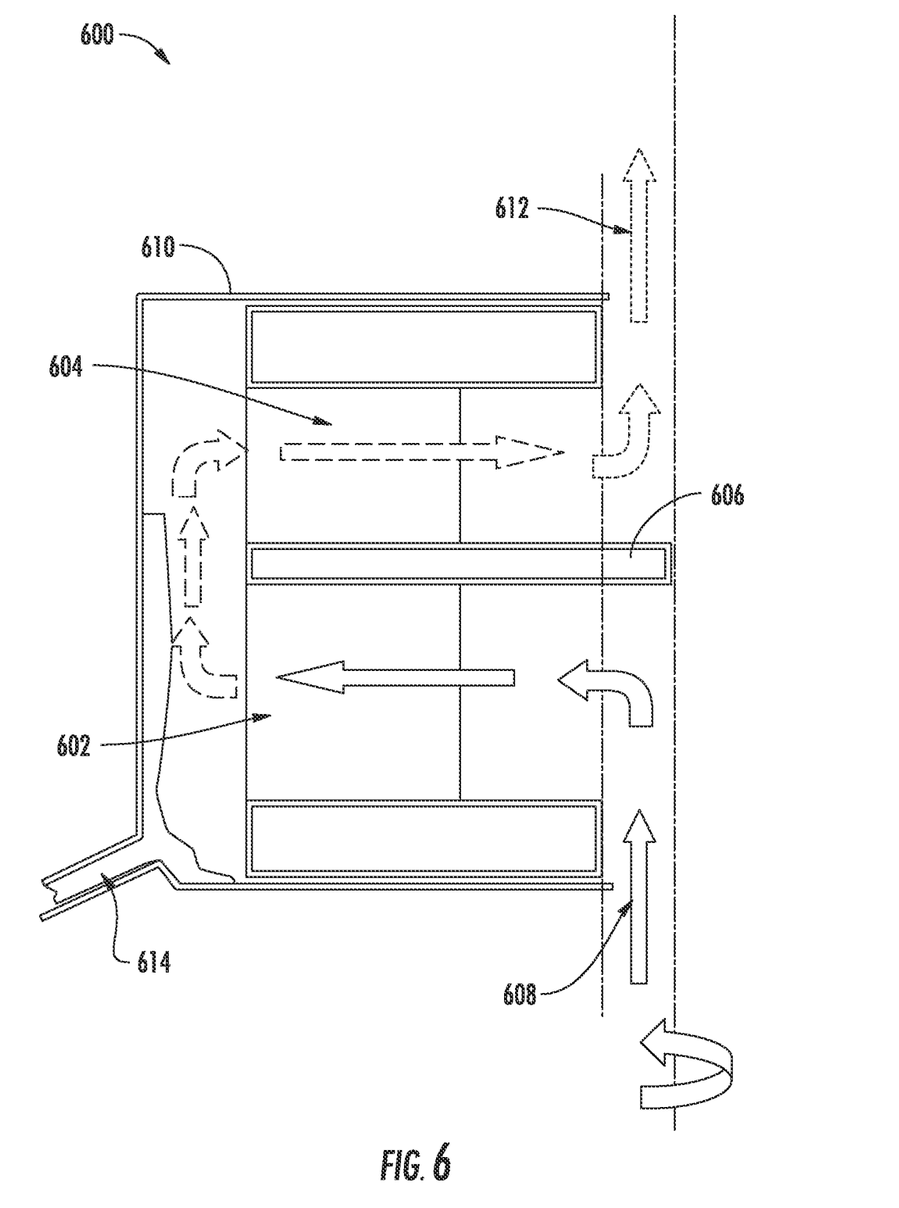
FIG. 6 is a cross-sectional view of a rotating coalescer device according to yet another exemplary embodiment.

Referring to FIG. 6, a cross-sectional view of a rotating coalescer device 600 is shown according to another exemplary embodiment. The rotating coalescer device 600 includes a primary rotating coalescing element 602 and a downstream, secondary rotating coalescing element 604. Both the primary and secondary rotating coalescing elements 602 and 604 rotate to effect separation of oil from and pumping of blow-by gas passing through the rotating coalescer device 600. Both the primary and secondary rotating coalescing elements 602 and 604 are comprised of filter media. The secondary element 604 can be comprised of either similar filter media material or another type of media material as the primary coalescing element 602. The two coalescing elements 602 and 604 are separated by a barrier 606 positioned between the two elements 602 and 604. The barrier 606 ensures that by-pass gas flows first through the primary coalescing element 602 (in an inside-out flow pattern) and then through the secondary coalescing element 604 (in an outside-in flow pattern). The barrier 606 ensures that the by-pass gases flowing through the two coalescing elements 602 and 604 do not mix. The primary and secondary coalescing elements 602 and 604 are rotated with either a single or multiple shafts driven by a single drive mechanism or multiple drive mechanisms. The by-pass flow enters through the inlet 608 on the upstream side and then exits radially out of the primary coalescing element 602. The flow then passes through a secondary rotating coalescing element 604 on its way towards the downstream clean side. As the by-pass gas flows through the secondary coalescing element 604, the secondary coalescing element 604 captures any re-entrained oil droplets and excessive oil that gets carried over rendering the air flow on the downstream side completely oil free. The secondary coalescing element 604 will eliminate any carryover oil that has not previously drained from the device. Any further carryover oil has to overcome the centrifugal force created by the rotating secondary element. Clean air passes out of the housing 610 through an outlet 612. Separated oil exits the housing through a drain 614.

Figure 7:
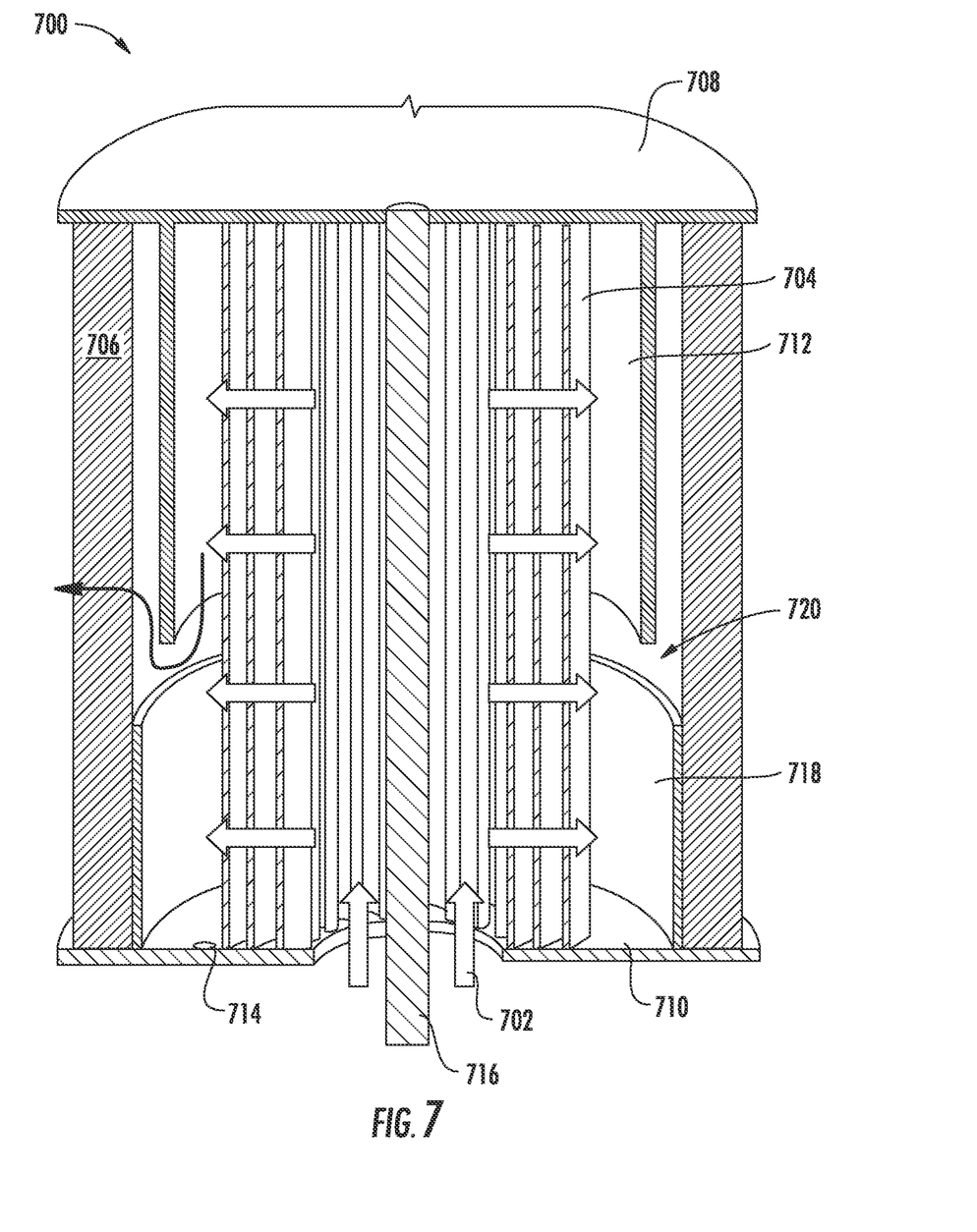
FIG. 7 is a cross-sectional perspective view of a rotating coalescer according to an exemplary embodiment.

Referring to FIG. 7, a cross-sectional perspective view of a rotating coalescer 700 is shown according to still another exemplary embodiment. The rotating coalescer 700 separates oil from blow-by gas entering the rotating coalescer 700 through a central inlet 702. The rotating coalescer 700 is a two-stage coalescer. The blow-by gas is first routed from the central inlet 702 through a spiral vane preseparator 704 in an inside-out flow direction. After passing through the spiral vane preseparator 704, the blow-by gas is routed through a coalescer element 706. The coalescer element 706 is comprised of coalescing filter media. The coalescer element 706 circumferentially surrounds the spiral vane preseparator 704. Both the spiral vane preseparator 704 and the coalescer element 706 are rotated about a central axis to effect pumping of the blow-by gas through the rotating coalescer 700 and to effect separation of the oil from the blow-by gas. The spiral vane preseparator 704 separates the bigger aerosol in the blow-by gas mitigating the risk that the coalescer element 706 becomes plugged with the highly viscous emulsion or soot contained in the blow-by gas. Accordingly, the spiral vane preseparator 704 increases the service life of the coalescer element 706.

Figure 9:
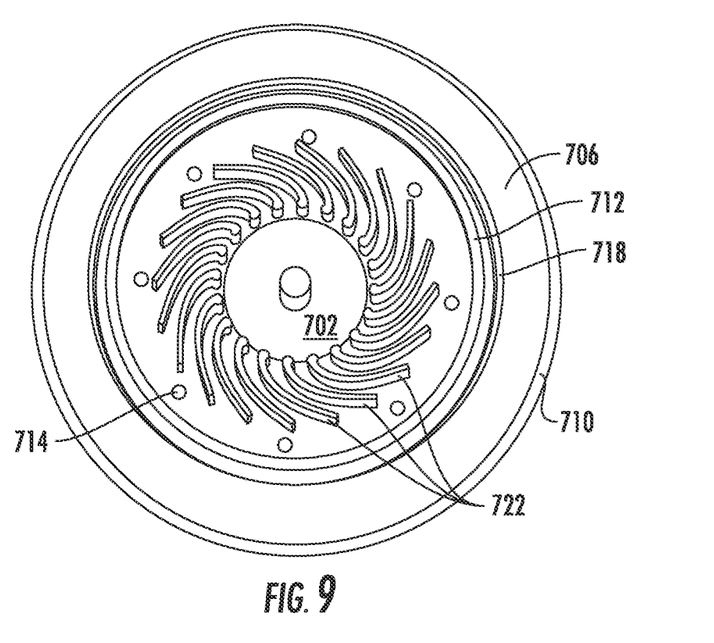

The spiral vane preseparator 704 and the coalescer element 706 are each coupled to a first endplate 708 and a second endplate 710. The first endplate 708 is solid. The second endplate 710 includes the central inlet 702. The first endplate 708 and the second endplate 710 seal the clean side of the rotating coalescer 700 from the dirty side of the rotating coalescer 700 such that the blow-by gas cannot bypass the rotating coalescer 700. The first endplate 708 includes a shroud 712. The shroud 712 guides separated oil exiting the spiral vane preseparator 704 to the second endplate 710 via gravity. The shroud 712 circumscribes the spiral vane preseparator 704. The separated oil falls from the shroud and exits a weep hole 714 in the second endplate 710 for drainage from a housing of the rotating coalescer 700. In some arrangements, a plurality of weep holes 714 are positioned along the second endplate 710 (e.g., as shown in FIG. 9). The first endplate 708 is also coupled to a shaft 716 that effects rotation of the rotating coalescer 700. The second endplate includes an oleophobic screen 718. The oleophobic screen 718 circumscribes the spiral vane preseparator 704. The oleophobic screen 718 is an oleophobic media or screen that guides separated oil exiting the spiral vane preseparator 704 to the second endplate 710 via gravity such that the separated oil can exit the weep hole 714. The oleophobic screen allows blow-by gas to pass through the oleophobic screen 718 and into the coalescer element 706. The oleophobic screen 718 is radially offset from the shroud 712 with respect to a center axis of the rotating coalescer 700 such that the oleophobic screen 718 is farther away from the center axis than the shroud 712 (e.g., as shown best in FIG. 9). The oleophobic screen 718 beads up separated oil and allows the separated oil to drain to the second endplate 710 and out the weep hole 714. In some arrangements, the oleophobic screen 718 is in contact with the coalescer element 706 and provides structural support to the coalescer element 706. An axial gap 720 exists between the shroud 712 and the oleophobic screen 718 such that the blow-by gas can pass from the spiral vane preseparator 704 to the coalescer element 706. The gap 720 is sized to minimize the chance that oil droplets separated by the spiral vane preseparator 704 contact the coalescer element 706.

Figure 8:
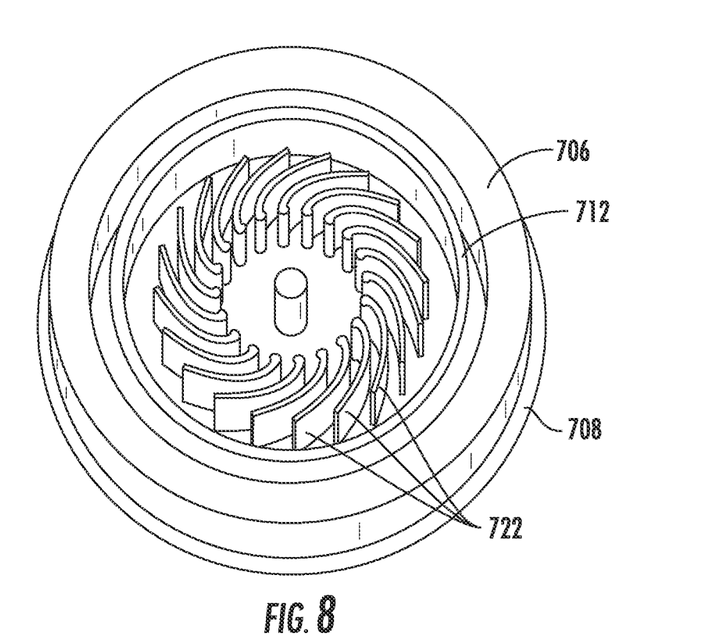
FIGS. 8 and 9 are cross-sectional views of the endplates of the rotating coalescer of FIG. 7.

Referring to FIGS. 8 and 9, cross-sectional views of the endplates 708 and 710 of the rotating coalescer 700 are shown. FIG. 8 shows a cross-sectional view showing the first endplate 708. FIG. 9 shows a cross-sectional view showing the second endplate 710. As shown in FIGS. 8 and 9, the spiral vane preseparator 704 includes a plurality of vanes 722. Each of the vanes 722 is spaced apart to permit blow-by gas to flow between adjacent vanes. Each of the vanes 722 is curved. The curvature of the vanes 722 is selected to create a pumping effect on the blow-by gas when the rotating coalescer 700 is rotating. Additionally, the curvature of the vanes 722 provides an impact surface for oil in the blow-by gas to undergo inertial separation from the air in the blow-by gas. During operation, separated and coalesced droplets of oil are pushed along the walls of the vanes 722 due to the radial flux of the flow and can either hit the shroud 712 or can drain to the bottom of the second endplate 710. Draining of the oil out of the weep hole 714 can occur during operation or after the rotating coalescer 700 has stopped rotating or has slowed rotation (e.g., after the engine has shut off).

Figure 10:
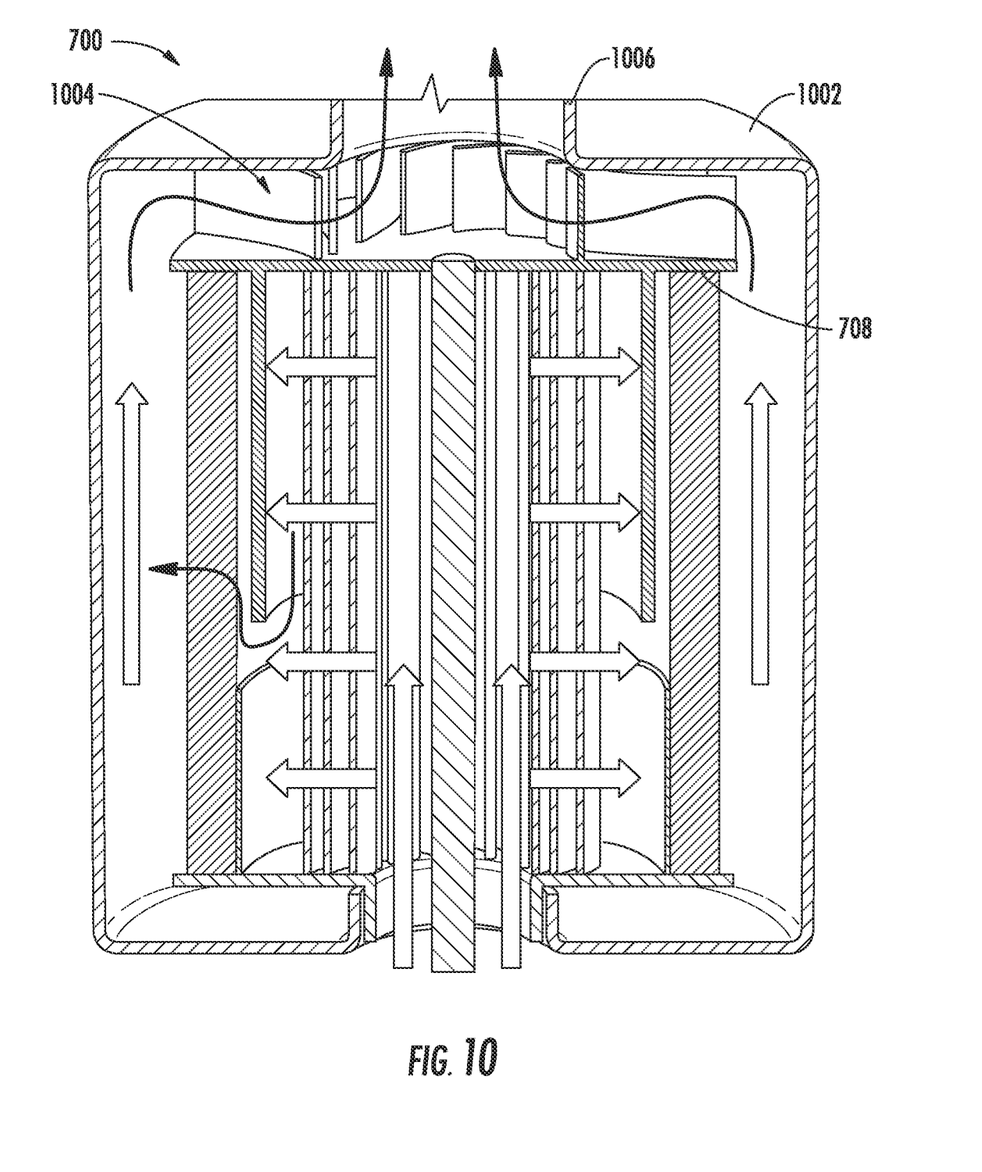
FIG. 10 is a cross-sectional view of the rotating coalescer of FIG. 7 fitted within a housing and having a de-swirler attached.
Figure 11:
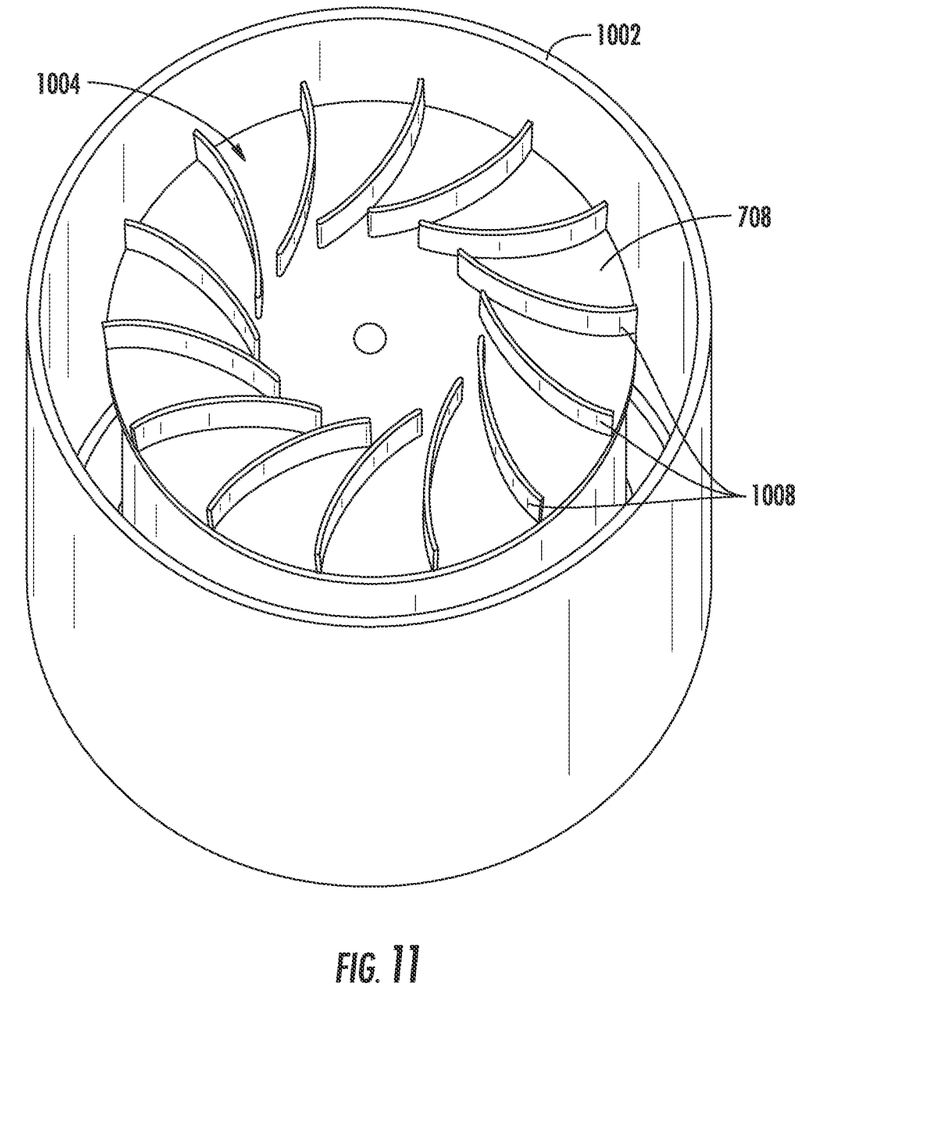
FIG. 11 is a cross-sectional view showing the de-swirler of FIG. 10.

Referring to FIG. 10, a cross-sectional view of the rotating coalescer 700 fitted within a housing 1002 is shown. In the arrangement of FIG. 10, the first endplate 708 is fitted with a de-swirler 1004. The de-swirler 1004 reduces the rotation of the filtered air exiting the rotating coalescer 700, which provides a smoother flow of filtered air out of the housing 1002. The filtered air leaving the rotating coalescer 700 is a swirling flow. The swirling flow coming out of the rotating coalescer 700 will slow down due to proximity to the stationary wall of the housing 1002. However, as the swirling flow nears the outlet 1006 of the housing 1002, the swirling flow will begin spinning faster due to conservation of angular momentum. Accordingly, the swirling flow will reach the rotational speed of the rotating coalescer 700 at some radial location along the first endplate 708 if not stopped. Accordingly, the de-swirler 1004 is configured to reduce the rotational speed of the swirling flow. As shown in FIG. 11, the de-swirler 1004 includes a plurality of vanes 1008. The vanes 1008 are curved in the opposite direction of the vanes 722 of the spiral vane preseparator 704. The vanes 1008 deflect the swirling flow of filtered air in the opposite direction of rotation of the swirling flow thereby reducing the rotational velocity of the filtered air to a small value. The straightening of the swirling flow reduces the pressure drop of the rotating coalescer 700. Additionally, the vanes 1008 provide protection against oil carry over.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

It should be noted that any use of the term "exemplary" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments, and elements from different embodiments may be combined in a manner understood to one of ordinary skill in the art. Other substitutions, modifications, changes and omissions may also be made in the design, operating conditions and arrangement of the various exemplary embodiments without departing from the scope of the present invention.

What is claimed is:

1. A multiple stage rotating coalescer device comprising:
   a first stage comprising a rotating coalescing element comprising coalescing media, the rotating coalescing element comprising an endplate sealing a clean side of the coalescing media from a dirty side of the coalescing media;
   a second stage, either upstream or downstream of the first stage, comprising
   a rotating cone stack separator; and
   a de-swirler positioned downstream of the first stage and the second stage, the endplate fitted with the de-swirler on an opposite side of the endplate from the coalescing media.

2. The device of claim 1, configured such that flow through the first stage is inside-out and flow through the second stage is inside-out.

3. The device of claim 1, configured such that flow through the first stage is inside-out and flow through the second stage is outside-in.

4. The device of claim 1, wherein the coalescing media is embedded in cone stacks of the cone stack separator.

5. The device of claim 1, wherein the cone stack separator is downstream of the coalescing element and flow through the cone stack separator is inside-out.

6. The device of claim 1, wherein the de-swirler includes a plurality of vanes that deflect a rotating flow of air in an opposite direction of a rotation of the rotating flow of air prior to the air exiting the device.

7. The device of claim 1, wherein the cone stack separator is upstream of the coalescing element.

8. The device of claim 7, further comprising a shroud in between the cone stack separator and the coalescing element for collecting fluid from the cone stack separator.

9. The device of claim 8, further comprising a drain hole for draining fluid collected on the shroud.

10. The device of claim 8, wherein the cone stacks include slots or holes that allow fluid to drain through the cone stacks.

11. A rotating coalescer system comprising:
a housing having an inlet configured to receive blow-by gas from a crankcase of an internal combustion engine and an outlet configured to output filtered air;
a rotating coalescer positioned within the housing, the rotating coalescer including:
a first endplate,
a second endplate,
a spiral vane preseparator positioned between the first endplate and the second endplate, the spiral vane preseparator including a plurality of curved vanes that cause separation of an oil from the blow-by gas and pumping of the blow-by gas when the spiral vane preseparator is rotating,
a coalescer element circumferentially surrounding the spiral vane preseparator and positioned between the first endplate and the second endplate, the coalescer element comprising coalescer media, and
a de-swirler coupled to the first endplate opposite the spiral vane preseparator and the coalescer element.

12. The system of claim 11, further comprising an oleophobic screen coupled to the second endplate and circumscribing the spiral vane preseparator.

13. The system of claim 12, wherein the oleophobic screen contacts the coalescer element.

14. The system of claim 11, further comprising a shroud coupled to the first endplate and positioned between the spiral vane preseparator and the coalescer element.

15. The system of claim 11, wherein the de-swirler includes a plurality of de-swirling vanes curved in an opposite direction of the plurality of vanes of the spiral vane preseparator.

* * * * *